United States Patent [19]

Shimano

[11] Patent Number: 5,016,097
[45] Date of Patent: May 14, 1991

[54] METHOD OF OBTAINING MONOCHROMATIC IMAGE FROM COLOR ORIGINAL THROUGH COLOR IMAGE RECORDER

[75] Inventor: Masanori Shimano, Tokyo, Japan

[73] Assignee: Dainippon Screen Mfg. Co., Ltd., Japan

[21] Appl. No.: 282,117

[22] Filed: Dec. 9, 1988

[30] Foreign Application Priority Data

Dec. 9, 1987 [JP] Japan ................... 62-309673
Aug. 26, 1988 [JP] Japan ................... 63-213331

[51] Int. Cl.⁵ ........................... G03F 3/08
[52] U.S. Cl. ......................... 358/79; 358/75; 358/80; 346/140 R
[58] Field of Search ............ 358/75, 75 IJ, 78, 80, 358/76, 77, 79; 346/157, 140

[56] References Cited

U.S. PATENT DOCUMENTS

| | | | |
|---|---|---|---|
| 4,319,268 | 3/1982 | Yamada | 358/80 |
| 4,402,007 | 8/1983 | Yamada | 358/75 |
| 4,564,859 | 1/1986 | Knop et al. | 358/75 |
| 4,589,035 | 5/1986 | Yamanishi et al. | 346/157 |
| 4,668,979 | 5/1987 | Jüng | 358/80 |
| 4,769,696 | 9/1988 | Utsuda et al. | 358/75 |
| 4,926,252 | 5/1990 | Nagano | 358/75 |

FOREIGN PATENT DOCUMENTS 0163966 1/1984 Japan ................... 358/79

Primary Examiner—Tommy P. Chin
Assistant Examiner—Safet Metjahic
Attorney, Agent, or Firm—Ostrolenk, Faber, Gerb & Soffen

[57] ABSTRACT

A magenta signal (M) may be selected from four color component signals, (Y, M, C and K) through a switching circuit (10) and is subjected to respective gradation corrections in gradation correction circuits (11Y, 11M, 11C and 11K) in parallel. Images for yellow, magenta, cyan and black blocks are recorded on a photosensitive film (5) from the signals obtained via the gradation correction circuits. Color inks are overprinted on a common paper through the blocks, thereby to obtain a monochromatic image on the paper.

21 Claims, 4 Drawing Sheets

METHOD OF OBTAINING MONOCHROMATIC IMAGE FROM COLOR ORIGINAL THROUGH COLOR IMAGE RECORDER

BACKGROUND OF THE INVENTION

1. Field of the Invention

The present invention relates to a method of obtaining a monochromatic image from a color original by means of a color image recorder operable to read the image of the color original through image scanning thereof.

2. Description of the Prior Art

As is well known in the art, a color process scanner is employed for obtaining color printing blocks such as yellow, magenta, cyan and black blocks. The color process scanner photoelectrically scans an image of a color original and records respective color components of the image on respective recording medium. In a drum type scanner, for example, the recording medium, such as a photosensitive film, is wound on a recording drum, and the color component images are recorded thereon in parallel. The color component images are arrayed along the main scanning direction, (i.e., the circumferential direction) of the recording drum. In order to prevent a ripple effect on a printed image, the color component images are recorded as halftone dot images having different screen angles. For example, the respective screen angles for yellow, magenta, cyan and black blocks may be set at 0°, 15°, 75° and 45° respectively. A technique for attaining such an improvement has been established.

After the color component blocks are obtained, color inks corresponding to the color components are applied to the blocks, respectively, and color component images on the blocks are printed on a common paper through transferance of the inks, to obtain a printed color image.

On the other hand, it is often required to print a color image in a monochromatic color. In one basic method of attaining a monochromatic print, one of the color component blocks, e.g., the magenta block, is selected, and the monochromatic image is obtained by applying a black ink to the block to transfer the "black" image thereon to a printing paper. Although the method has the advantage that no complex process is required, the resultant monochromatic image lacks depth since the optical density range therein is narrowly restricted due to the intrinsic density range of the black ink.

To compensate for the lack of depth, another technique has been developed, wherein one of the color component signals obtained by reading a color original image is arbitrarily selected. The selected signal, e.g., a color component signal for a magenta block, is used to serially obtain recorded images at different screen angles. Then, a plurality of blocks are produced according to the recorded images, respectively, and different color inks (such as yellow, magenta and cyan) are applied to the respective blocks, and the blocks are used to print a single image. Although the printed image is formed by the combination of the different color inks, it is substantially monochromatic, since the color inks are so overprinted on the paper that the subtractive color mixture of the color inks expresses the monochromatic color, e.g., achromatic color. The technique is very useful for obtaining a monochromatic image having great depth, and therefore, it is often used in the printing process.

However, the conventional technique for attaining the overprinting has the disadvantage that the process is complicated and slow since the process step required to read the color original image must be repeated in order to obtain the different color blocks, and a desired gradation character and a screen angle must be provided for all of the color component signals serially while changing the screen angle for each color component signal. This is a serious disadvangage especially in the case where the image data processing is carried out with a color process scanner because the image processing takes a long time, and no other operations can be performed in the scanner until the image processing is completed.

Furthermore, the optical density of the recorded image is often shifted from the desired one for each color component, in which the shift depends on the selection of a color component signal to be employed, and therefore, the printed image is often somewhat unnatural.

SUMMARY OF THE INVENTION

The present invention provides a method of obtaining a monochromatic image from an original image through overprinting of a plurality of color inks.

According to the present invention, the method comprises the steps of: (a) preparing an original, (b) obtaining a single color component signal indicative of one color component of an image of said original, (c) applying a plurality of predetermined correction rules to said single color component signal in parallel to obtain a set of corrected color component signals, (d) producing a plurality of printing blocks as a function of said corrected color component signals, respectively, and (e) using said blocks to overprint a plurality of color inks on a common plane to obtain a monochromatic image substantially reproducing said image of said original in a monochromatic color on said common plane.

Preferably, said correction rules are so determined that the signals indicating an arbitrary level can be corrected through said correction rules in parallel to give a set of corrected signals substantially expressing a monochromatic image. In a preferred embodiment of the present invention, said monochromatic color is an achromatic color.

The correction rules may have gradation correction rules for different colors.

In one aspect of the present invention, the step (c) is replaced with the step of mixing said color component signals with each other to obtain a mixed color signal, and the correction rules are applied to the mixed color signal rather than the single color component. The mixed color may be a signal expressing a weighted average of a set of color component data.

The present invention also relates to an apparatus for attaining the method, wherein the apparatus comprises (a) an image reader for reading an image of an original for each color component to generate a set of color component signals, (b) a selecting circuit for selecting one color component signal from said set of color component signals, (c) a plurality of correction circuits in which predetermined color signal correction rules are previously set, (d) a transmission circuit for transmitting said one color component signal to each of said correction circuits in parallel to obtain a plurality of corrected color component signals from said correction circuits, and (e) an image recorder for recording images expressed by said corrected color component signals on a recording medium to obtain said recorded images.

The selecting circuit may be replaced by a mixing circuit for mixing the color component signals with each other to obtain a mixed color signal, and the mixed color signal is supplied to the correction circuits in parallel, in place of the one color component signal.

According to the present invention, a monochromatic image can be obtained from a color original at a high speed since the corrected color component signals are obtained in parallel. When the mixed color data is employed, the monochromatic image is especially faithful to the image tone of the original.

Accordingly, an object of the present invention is to provide a method by which a reproduced monochromatic image can be obtained at a high speed.

Another object of the present invention is to improve the depth of the reproduced monochromatic image.

A further object is to reproduce a monochromatic image whose tone is faithful to that of an original image.

Another object of the present invention is to provide an apparatus suitable for attaining the improved method.

A still further object of the present invention is to provide an apparatus able to select a color component signal to be employed for image reproduction.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
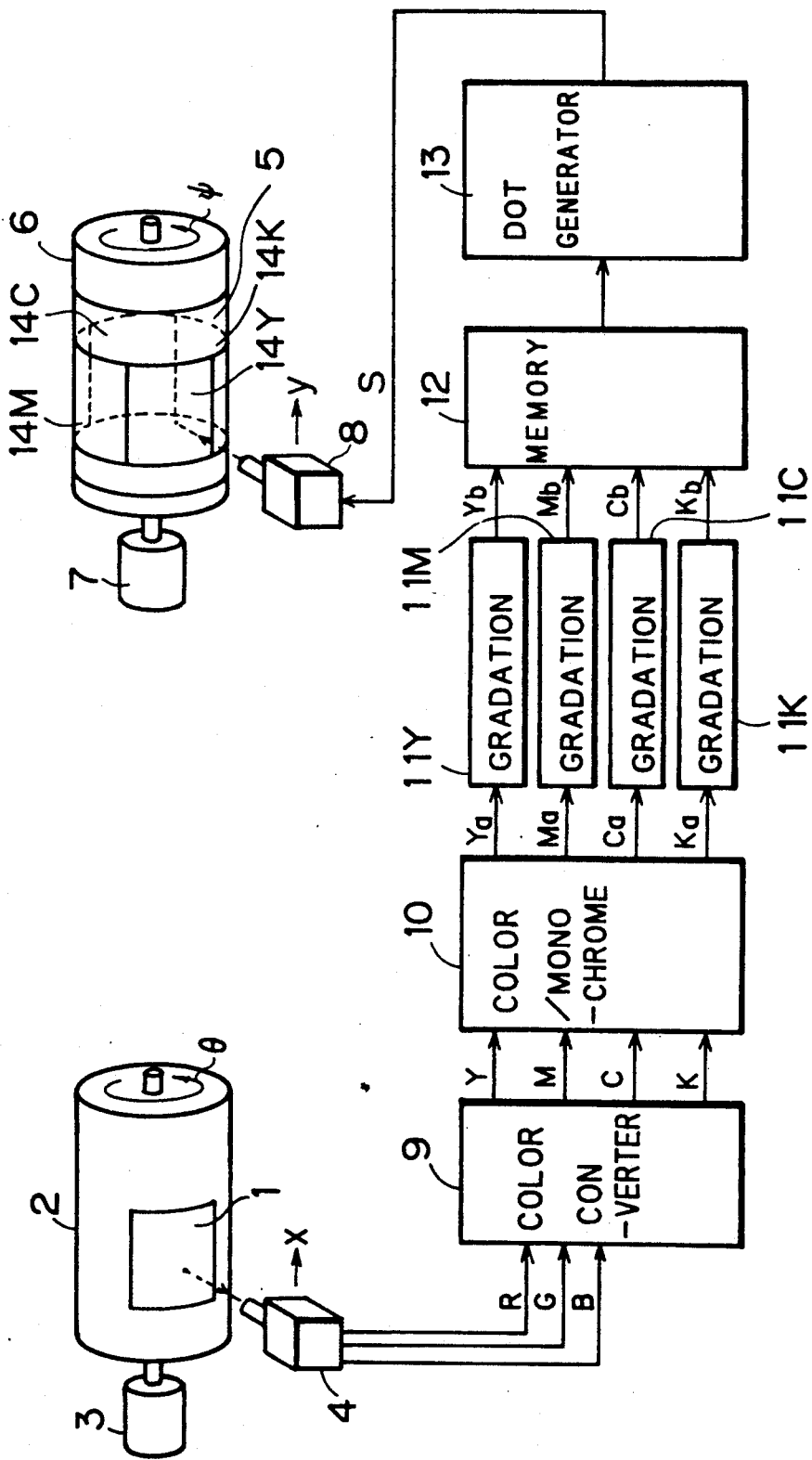
FIG. 1 is a block diagram showing a drum type color process scanner according to a preferred embodiment of the present invention.

FIG. 1 shows a drum type color process scanner according to a preferred embodiment of the present invention. A transparent original drum 2 on which a color original 1 is located is rotated in the direction $\theta$ by means of a motor 3. A light source (not shown) provided in the inner space of the original drum 2 emits light to a scanning area of the color original 1. The light through the color original 1, (containing color image information from the scanning area of the color original 1) passes and is picked up by a pick-up head 4 which is moved along the longitudinal direction x of the original drum 2 by means of a driving mechanism (not shown).

Through the rotation of the original drum 2 and the translational movement of the pick-up head 4, a desired area on the original 1 is scanned pixel by pixel, whereby the color image of the original 1 is serially read along the scanning lines on the original 1. The direction antiparallel to the direction $\theta$ is the main scanning direction, while the direction x is a subscanning direction.

The pick-up head 4 comprises a set of photoelectric converters for converting the color components of the light to electric primary color signals R, G and B representing the red, green and blue components of the original color image, respectively.

The first set of color signals R, G and B is delivered to a color converter 9, to be converted into a second set of color component signals Y, M, C and K representing yellow, magenta, cyan and black negative components of the original color image. A color/monochrome switching circuit 10 is coupled to the output of the color converter 9 and has a structure which will be described later. The circuit 10 is operable to convert the second set of color component signals Y, M, C and K to a third set of color component signals $Y_a$, $M_a$, $C_a$ and $K_a$. The relationship between the input signals Y, M, C and K, and the output signals $Y_a$, $M_a$, $C_a$ and $K_a$ will also be described below.

Figure 2:
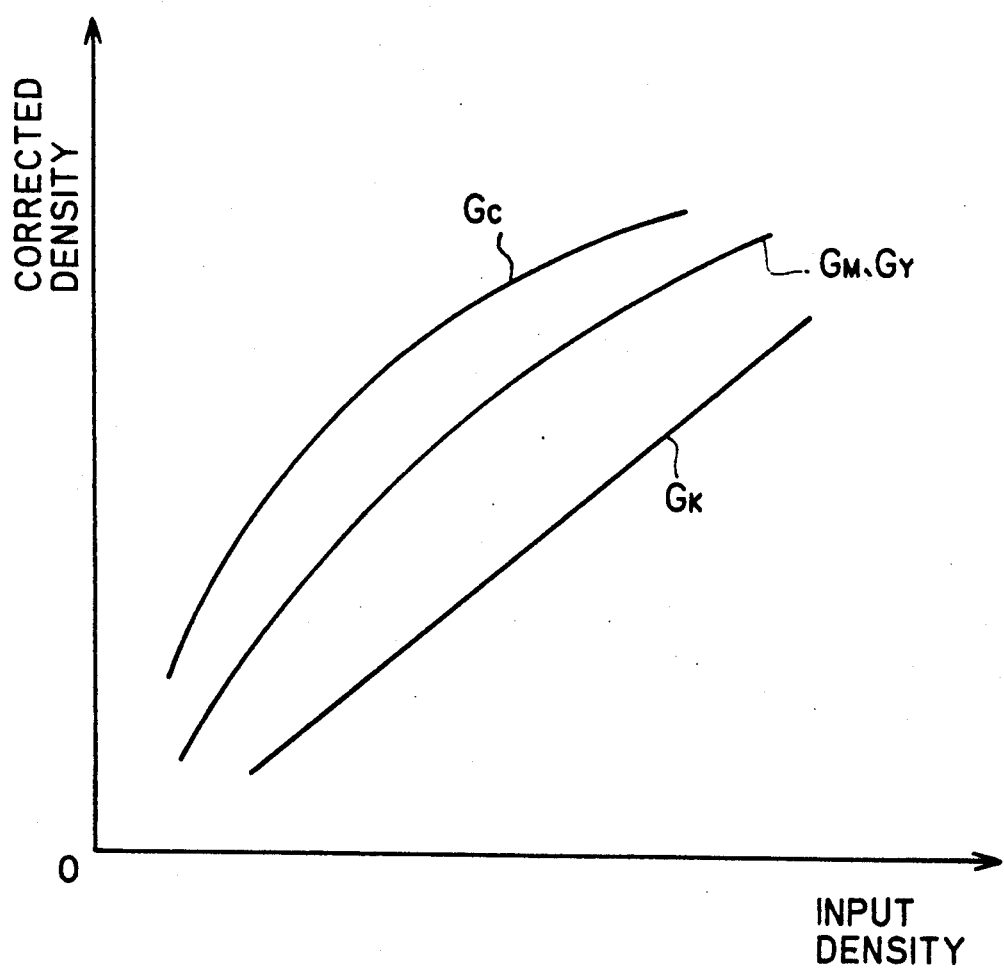
FIG. 2 is a graph showing gradation correction curves employed in the preferred embodiment.

The color component signals $Y_a$, $M_a$, $C_a$ and $K_a$ are supplied to gradation correction circuits 11Y, 11M, 11C and 11K, respectively, in which gradation curves suitable for correcting the respective gradations for the yellow, magenta, cyan and black components are previously stored, respectively. The gradation curves are so determined that, when an arbitrary one of the color component signals $Y_a$, $M_a$, $C_a$ and $K_a$ is selected and applied in parallel to be corrected in the circuits 11Y, 11M, 11C and 11K a fourth set of corrected signals $Y_b$, $M_b$, $C_b$ and $M_b$ substantially expresses a monochromatic image. In the preferred embodiment, the monochromatic image is an achromatic color image. Such a set of gradation curves can be obtained by experimentation, and an example thereof is shown in FIG. 2. The gradation curves $G_Y$, $G_M$, $G_C$ and $G_K$ are previously set in the gradation correction circuits 11Y, 11M, 11C and 11K, respectively. In the preferred embodiment, the gradation curves $G_Y$, $G_M$, $G_C$ and $G_K$ are so determined that a set of signals obtained by correcting data having an arbitrary level through gradation curves $G_Y$, $G_M$, $G_C$ and $G_K$ in parallel represents an achromatic image.

The color component signals $Y_a$, $M_a$, $C_a$ and $K_a$ are subjected to the gradation corrections in the circuits 11Y, 11M, 11C and 11K, respectively, where the respective gradation corrections in the gradation correction circuits 11Y, 11M, 11C and 11K are carried out in parallel. Then, the corrected signals are supplied to a memory 12 as corrected color component signals $Y_b$, $M_b$, $C_b$ and $K_b$. The color component data expressed by the signals $Y_b$, $M_b$, $C_b$ and $K_b$ are temporarily stored in the memory 12. The respective color component data for yellow, magenta, cyan and black blocks are transferred to a halftone dot generator 13, to be converted into halftone dot image data corresponding to screen angles 0°, 15°, 75° and 45°, respectively. The respective halftone dot image data for yellow, magenta, cyan and black blocks are arranged in series for each scanning line, and delivered to an exposure head 8 in the form of a time sharing image signal S.

The exposure head 8 is moved along the longitudinal direction y of a recording drum 6 by means of a driving mechanism (not shown) synchronized with that of the pick-up head 4. The recording drum 6 is rotated in the direction $\phi$ by a motor 7. A photosensitive film 5 is wound around the recording drum 6, onto which the recording head 8 emits a laser beam modulated in response to the image signal S. Since the image signal S is indicative of the halftone dot image data for respective color components in a time sharing (interlaced) manner for each scanning line, the areas 14Y, 14M, 14C and 14K of the film 5 being arrayed along the circumferential direction of the recording drum 6 are exposed to the laser beam in series for each scanning line, but substantially in parallel as a whole. As a result, respective latent halftone dot images for yellow, magenta, cyan and black blocks are recorded on the areas 14Y, 14M, 14C and 14K in the different screen angles, respectively.

Figure 3:
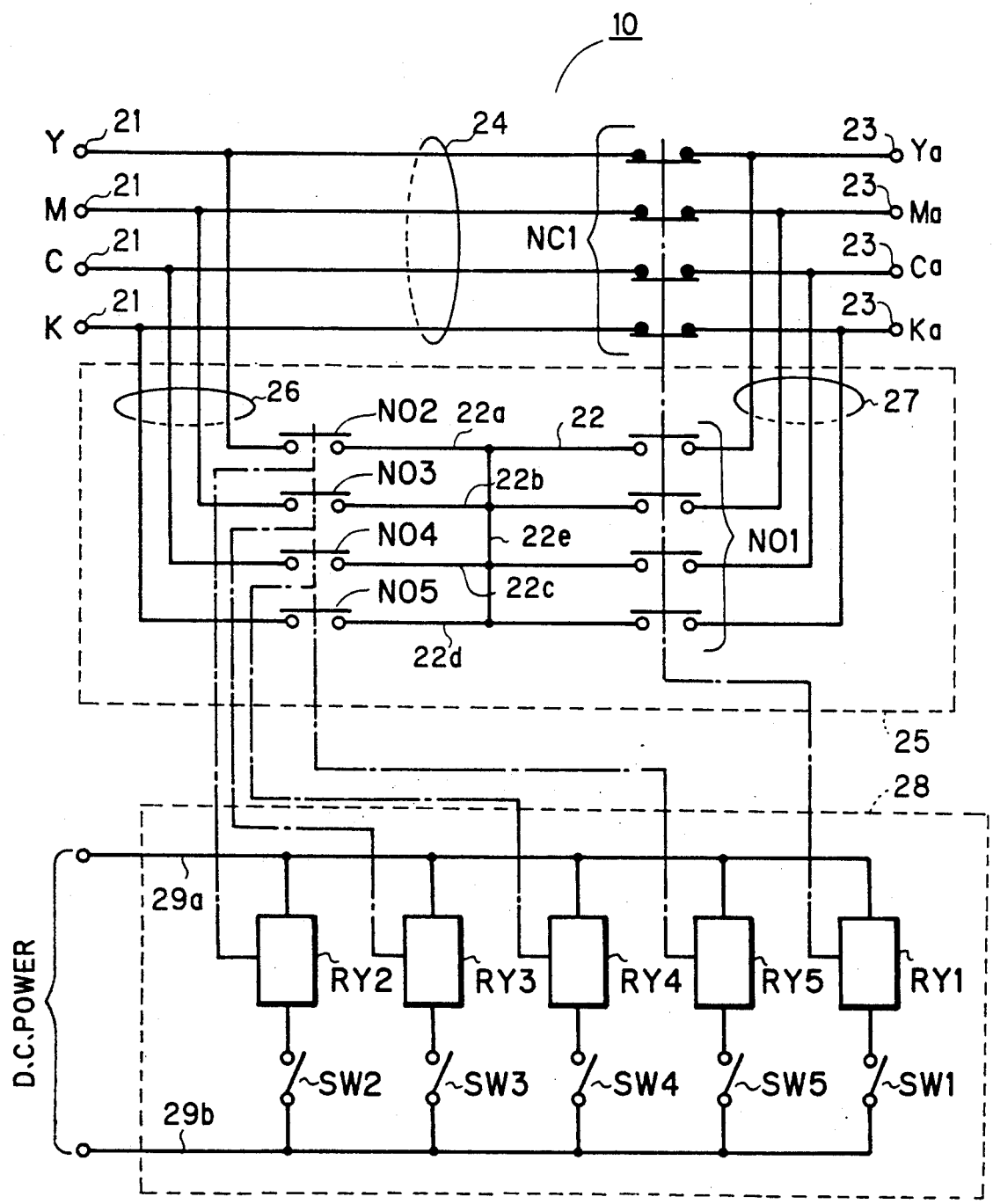
FIG. 3 is a circuit diagram showing an example of a color/monochrome switching circuit employed in the preferred embodiment.

The internal structure of the color/monochrome switching circuit 10 is shown in FIG. 3. The color component signals Y, M, C and K are applied to the respective input terminals 21. Main signal lines 24 are provided between the input terminals 21 and output terminals 23, a set of normally closed contacts NC1 being inserted therein.

The switching circuit 10 has a bypass circuit 25 through which the normally closed contacts NC1 are bypassed. The bypass circuit 25 has input lines 26 branching from the main signal path 24 at the nodes between the input terminals 21 and normally closed contacts NC1, and output lines 27 connected to the nodes between the normally closed contacts NC1 and the output terminals 23. The input lines 26 are connected to respective normally open contacts NO2–NO5, and the normally open contacts NO2-NO5 are coupled to a set of normally open contacts NO1 through a connection circuit 22. The connection circuit 22 has four lines 22a-22d connecting the normally open contacts NO2-NO5 with respective ones of the normally open contacts NO1, and an interconnecting line 22e interconnecting the lines 22a-22d. The normally open contacts NO1 are connected to the output lines 27, whereby the signal path between the connection circuit 22 and the output lines 27 can be opened or closed via the contacts NO1.

The color/monochrome switching circuit 10 further comprises a control circuit 28 for controlling the respective switching operations of the switches NC1 and NO1-NO5. The control circuit 28 is provided with a pair of power lines 29a and 29b through which DC power is supplied to the control circuit 28. Relays RY1-RY5 are provided between the power lines 29a and 29b in parallel, and manual switches SW1-SW5 are connected to the relays RY1-RY5 in series, respectively. The relay RY1 is coupled to the contacts NC1 and NO1, and the other relays RY2-RY5 are coupled to the contacts NO2-NO5, respectively. When the manual switch SW1 is closed, the contacts NC1 and NO1 are automatically opened and closed, respectively, through the electromagnetic excitation of the relay RY1. On the other hand, when an arbitrary one of the manual switches SW2-SW5 are closed, the corresponding one of the normally open contacts NO2-NO5 is closed.

When it is desired to employ the color process scanner for color image recording, all of the manual switches SW1-SW5 are opened manually so that the normally closed contacts NC1 are closed and the normally open contacts NO2-NO5 are opened. Accordingly, the main signal lines 24 are electrically connected to the output terminals 23, and the bypass circuit 25 is disabled. The color component signals Y, M, C and K are transmitted to the output terminals 23 through the main signal lines 24 and contacts NC1, to be outputted from the circuit 10 as the signals $Y_a$, $M_a$, $C_a$ and $K_a$, respectively, i.e., $$Y_a=Y, M_a=M, C_a=C, \text{ and } K_a=K \quad (1)$$

Therefore, the color component images for yellow, magenta, cyan and black blocks are recorded on the areas 14Y, 14M, 14C and 14K, respectively, similar to the normal operation of a conventional color process scanner. The photosensitive film 5 is then developed, and the four printing blocks are produced by means of the developed film. Color inks of yellow, magenta, cyan and black are applied to the blocks, respectively, and the images on the printing blocks are overprinted on a paper. The printed image thus obtained is a color image reproducing the original color image.

On the other hand, when it is desired to obtain a monochromatic reproduced image, the manual switch SW1 and an arbitrary one of the manual switches SW2-SW5 are closed. In the following description, it is assumed that the manual switch SW3 is closed and the switches SW2, SW4 and SW5 are opened.

In response to the manual switching operation, the normally closed contacts NC1 are opened, and the normally open contacts NO1 and NO3 are closed, through the electromagnetic actuation of the relays RY1 and RY3. The other normally open contacts NO2, NO4 and NO5 remain open. Accordingly, the main signal path through the contacts NC1 is opened, and the bypass circuit 25 is enabled, so that only the magenta signal M is transmitted to the connection circuit 22. Since the interconnection line 22e is provided in the connection circuit 22, the magenta signal M is applied to all of the output terminals 23 through the contacts NO1 and the output lines 27. As a result, all of the output signals $Y_a$, $M_a$, $C_a$ and $K_a$ are the same signal as the magenta signal M, i.e., $$Y_a=M_a=C_a=K_a=M \quad (2)$$

The color component signals $Y_a$, $M_a$, $C_a$ and $K_a$ are supplied to the respective gradation correction circuits 11Y, 11M, 11C and 11K in parallel. The signals $Y_a$, $M_a$, $C_a$ and $K_a$ are subjected to the gradation corrections according to the respective gradation curves $G_Y$, $G_M$, $G_C$ and $G_K$ in parallel. The corrected signals $Y_b$, $M_b$, $C_b$ and $K_b$ are supplied to the memory 12 and the respective color component data expressed by the corrected signals are temporarily stored in the memory 12. The color component data is then read from the memory 12 and transmitted to the halftone dot generator 13. The halftone dot generator 13 converts the color component data into the halftone dot data, where the halftone dot data corresponding to the signals $Y_b$, $M_b$, $C_b$ and $K_b$ express halftone dot images in the screen angles 0°, 15°, 75° and 45°, respectively. The halftone dot data are arranged with each other to generate the image signal S, whereby color component images are recorded on the areas 14Y, 14M, 14C and 14K for each scanning line, respectively.

Although the signals $Y_a$, $M_a$, $C_a$ and $K_a$ are all the same due to the condition (2), the halftone dot data corresponding to the signals $Y_a$, $M_a$, $C_a$ and $K_a$ are different from each other since the gradation curves $G_Y$, $G_M$, $G_C$ and $G_K$ are individually prepared, and the respective screen angles for the yellow, magenta, cyan and black blocks are different from each other.

The exposed photosensitive film 5 is then developed, and blocks for yellow, magenta, cyan and black then are produced by means of the photosensitive film 5. Yellow, magenta, cyan and black inks are applied to the blocks, respectively, and the respective images or inks on the four blocks are overprinted on a common paper.

Since the gradation curves $G_Y$, $G_M$, $G_C$ and $G_K$ are so set that the combination of the color component signals $Y_b$, $M_b$, $C_b$ and $K_b$ represents an achromatic image, the image obtained through the overprinting is substantially an achromatic image. Furthermore, the monochromatic image has great depth due to the overprinting of the color inks.

Although an achromatic image is obtained in the preferred embodiment, another monochromatic image can be obtained through correction of the gradation curves. For example, when the gradation curves $G_M$ and $G_Y$ are relatively enhanced, a sepia image is obtained on the paper. Further, the color component signal Y, C or K may be employed as the signal to be commonly supplied to the gradation correction circuits 11Y, 11M, 11C and 11K, in place of the magenta signal M, by closing the corresponding switch SW2, SW4 or SW5 in place of the switch SW3.

Figure 4:
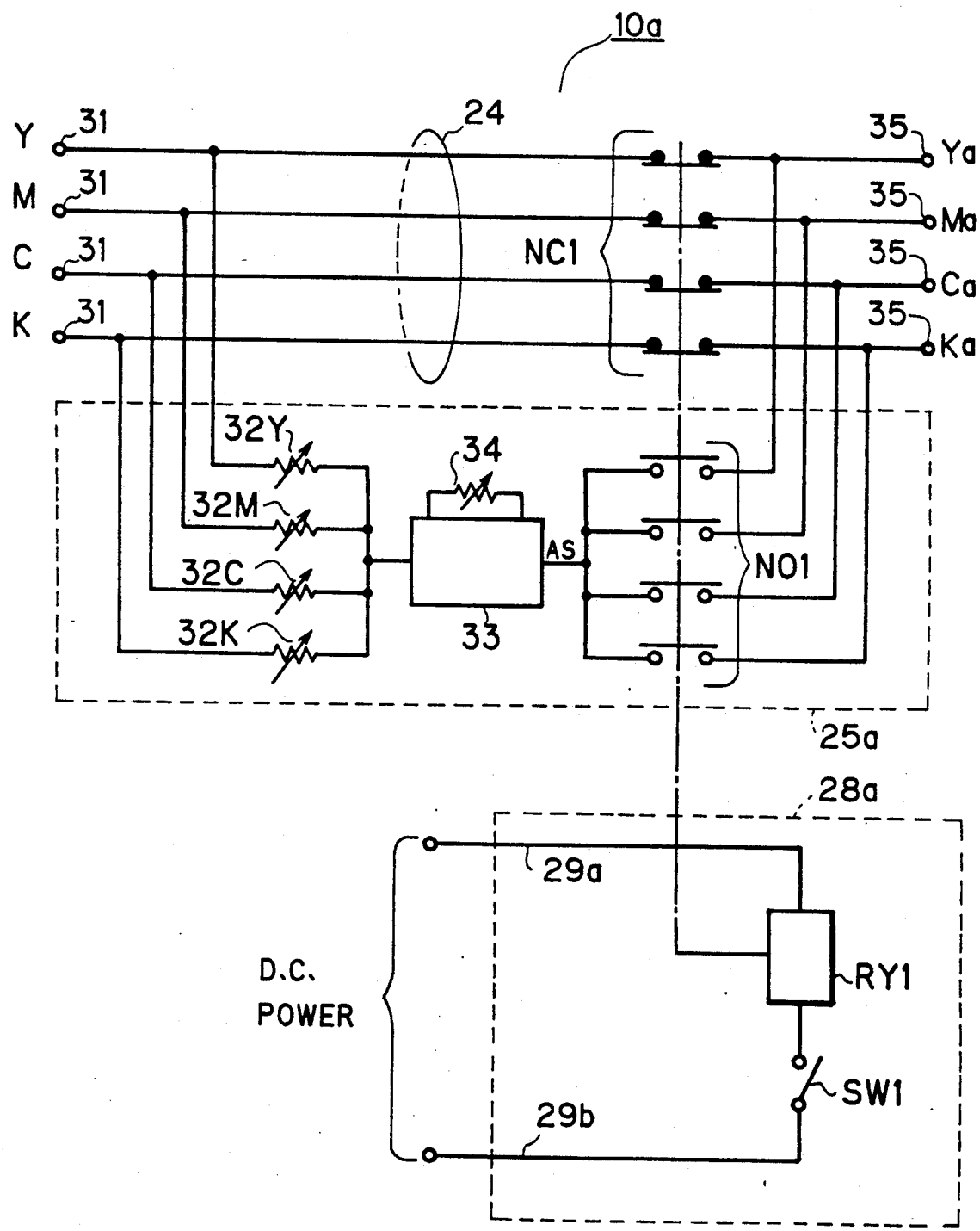
FIG. 4 is a circuit diagram showing another example of the color/monochrome switching circuit.

FIG. 4 is a circuit diagram showing another example of the color/monochrome switching circuit 10. As will be understood by comparing FIG. 4 with FIG. 3, variable resistors 32Y, 32M, 32C and 32K are provided in place of the contacts NO2-NO5, and respective first sides of the variable resistors 32Y, 32M, 32C and 32K are connected to each other. An analog adder 33 including an operational amplifier is inserted between the set of variable resistors 32Y, 32M, 32C and 32K and normally open contacts NO1. The analog adder 33 is provided with a variable resistor 34 for varying the gain.

For controlling a bypass circuit 25a and normally closed contacts NC1, a control circuit 28a having a relay RY1 and a manual switch SW1 is provided, where the relay RY1 is operable to electromagnetically drive the contacts NC1 and NO1.

When it is desired to obtain a color reproduced image, the manual switch SW1 is opened, so that the normally closed contacts NC1 are closed and the normally open contacts NO1 are opened. Accordingly, the bypass circuit 25a is disabled, and the color component signals Y, M, C and K inputted from input terminals 31 are transmitted to output terminals 35 through main signal lines 24 and the contacts NC1. As a result, the condition (1) already explained with reference to FIG. 3 is in effect and a color reproduced image is obtained similarly to a normal operation of a conventional color process scanner.

On the other hand, when it is desired to obtain a monochromatic reproduced image, the manual switch SW1 is closed, whereby the normally closed contacts NC1 are opened and the normally open contacts NC1 are closed. The variable resistors 32Y, 32M, 32C and 32K are previously adjusted at desired resistance values, respectively. Preferably, the respective resistance values of the variable resistors 32Y, 32M, 32C and 32K are not equal to each other, so that a weighted average of the color component signals Y, M, C and K is obtained by means of the analog adder 33. The weighted average is expressed by the weighted average signal AS, which is delivered to all of the output terminals 35 as the output signals $Y_a$, $M_a$, $C_a$ and $K_a$. Therefore, when the values of the weights for the input signals Y, M, C and K are expressed by y, m, c and k, respectively, the output signals, $Y_a$, $M_a$, $C_a$ and $K_a$ are provided as:

$$Y_a = M_a = C_a = K_a = AS \quad (3)$$

$$AS = g(yY + mM + cC + kK)/(y+m+c+k) \quad (4)$$

where the coefficient g has a value depending on the gain in the adder 33.

The following operation of the present color process scanner is similar to that employing the switching circuit 10 shown in FIG. 3, except that the weighted average signal AS is applied to the gradation correction circuits 11Y, 11M, 11C and 11K, in place of one of the color component signals Y, M, C and K. Color inks of yellow, magenta, cyan and black are applied to the blocks thus produced, respectively, and the respective images or inks on the blocks are overprinted on a common paper, so that a monochromatic image such as an achromatic image is obtained as the reproduced image.

One advantage of the process employing the switching circuit 10a shown in FIG. 4 is as follows: Supposing that the original color image has a relatively large amount of magenta component, the magenta signal M has a relatively low value since the magenta signal is obtained from the light passing through a green filter (not shown) provided in the pick-up head 4. Therefore, if the magenta signal M is employed as the common input signal to the gradation correction circuits 11Y, 11M, 11C and 11K, the printed monochromatic image obtained will tend to be a light or pale image. Alternatively, when the cyan color signal C obtained through a red filter is employed as the common input signal, the printed monochromatic image is inclined to be a dark image.

On the other hand when the weighted average signal AS generated in the switching circuit 10a of FIG. 4 is employed as the common input signal, the inclinations in the reproduced image described above cancel each other out so that a monochromatic image faithful to the density and tone of the original image is obtained on the printed paper. The common input signal for the gradation correction circuits 11Y, 11M, 11C and 11K may be another mixture signal obtained by mixing the color component signals accordance with a mixture rule other than the weighted average.

By way of example, the present invention can be modified as follows:

(a) The color/monochrome switching circuit 10 may be constructed as the combination of a logic circuit and an electronic switching element such as a switching transistor.

(b) Between the memory 12 and the halftone dot generator 13, a layout system for editing a plurality of images according to a desired layout may be provided.

(c) The present invention may be applied to the process of recording an image having a continuous tone such as a gravure printing, and that of directly producing gravure blocks by etching block materials while employing a layout system. When it is desired to obtain a continuous tone image, a conversion to a halftone dot image is carried out after the preliminary image recording is completed.

(d) The respective images for yellow, magenta, cyan and black blocks may be serially recorded on photosensitive films, respectively. One color component signal or a weighted average signal is commonly employed for serially recording the color component images.

(e) The present invention also may be used where the original image is a monochromatic image.

Although the present invention has been described and illustrated in detail, it should be clearly understood that the same is by way of illustration and example only and is not to be taken by way of limitation, the spirit and scope of the present invention being limited only by the terms of the appended claims.

I claim:

1. A method of obtaining a monochromatic image from a multicolor original image through overprinting of a plurality of color inks, said method comprising the steps of:
   (a) obtaining a single color component signal which is indicative of one color component of a multicolor original image,
   (b) simultaneously applying a plurality of predetermined correction rules to said single color component signal to obtain a set of corrected color component signals,
   (c) producing a plurality of printing blocks as a function of said corrected color component signals, and
   (d) using said printing blocks to overprint a plurality of color inks on a common plane to obtain a monochromatic image substantially reproducing said original image in a monochromatic color on said common plane.

2. A method in accordance with claim 1, wherein said correction rules operate in parallel to correct an arbitrary level to produce a set of corrected color component signals substantially expressing a monochromatic image.

3. A method in accordance with claim 1, wherein said monochromatic color is an achromatic color.

4. A method in accordance with claim 1, wherein the step (a) includes the steps of:
   (1) reading said original multicolor image to obtain a set of color component signals, and
   (2) extracting said single color component signal from said set of color component signals.

5. A method in accordance with claim 1, wherein said correction rules comprise gradation correction rules.

6. A method in accordance with claim 5, wherein the step (c) comprises the step of producing said printing blocks as halftone dot image blocks.

7. A method of obtaining a monochromatic image from a multicolor original image through overprinting of a plurality of color inks, said method comprising the steps of:
   (a) obtaining a set of color component signals which are indicative of color components of said multicolor original image,
   (b) mixing said color component signals with each other to obtain a mixed color signal,
   (c) simultaneously applying a plurality of predetermined correction rules to said mixed color signal to obtain a set of corrected color component signals,
   (d) producing a plurality of printing blocks as a function of said corrected color component signals, and
   (e) using said printing blocks to overprint a plurality of color inks on a common plane to obtain a monochromatic image substantially reproducing said original image in a monochromatic color on said common plane.

8. A method in accordance with claim 7, wherein the step (b) includes the step of obtaining a weighted average of said color component signals whereby said mixed color signal represents said weighted average.

9. A method in accordance with claim 7, wherein said correction rules are applied to said mixed color signal in parallel.

10. A method in accordance with claim 8, wherein said monochromatic color is an achromatic color.

11. An apparatus for reading a multicolor original and for obtaining a plurality of recorded images for producing a plurality of color blocks for printing a monochromatic image on a printing medium, said apparatus comprising:
    (a) means for reading the multicolor original to generate a plurality of color component signals,
    (b) selecting means for selecting one color component signal from said color component signals,
    (c) a plurality of correction means for modifying signals applied thereto in accordance with predetermined color signal correction rules,
    (d) transmission means for simultaneously transmitting said one color component signal to each of said correction means whereby a plurality of corrected color component signals are produced at outputs of said correction means, and
    (e) means coupled to the outputs of said correction means for recording images indicative of said corrected color component signals on a recording medium.

12. An apparatus in accordance with claim 11, wherein said selecting means is responsive to a first manual operation.

13. An apparatus in accordance with claim 28, further comprising means for enabling said transmission means in response to a second manual operation.

14. An apparatus for reading a multicolor original to obtain a plurality of recorded images for producing a plurality of color blocks for printing a monochromatic image on a printing medium, said apparatus comprising:
    (a) means for reading the multicolor original to generate a plurality of color component signals, said color component signals consisting of a yellow component signal, a magenta component signal, a cyan component signal and a black component signal, which are representative of yellow, magenta, cyan and black negative components of said multicolor original, respectively,
    (b) mixing means for mixing said yellow, magenta, cyan and black component signals to obtain a mixed color signal,
    (c) a plurality of correction means for modifying signals applied thereto as a function of predetermined color signal correction rules,
    (d) transmission means for simultaneously transmitting said mixed color signal to said correction means to obtain a plurality of corrected color component signals at outputs of said correction means, and
    (e) means coupled to the outputs of said correction means for recording images indicative of said corrected color component signals on a recording medium.

15. An apparatus in accordance with claim 14, wherein said mixing means comprises averaging means for obtaining a weighted average of said yellow, magenta, cyan and black component signals such that said mixed color signal represents said weighted average.

16. An apparatus in accordance with claim 15, wherein
    said mixing means further comprises:
    (b-2) means for varying weight values for said weighted average in response to a first manual operation.

17. An apparatus in accordance with claim 16, further comprising means for enabling said transmission means in response to a second manual operation.

18. Apparatus for obtaining a monochromatic image from an original color image, said apparatus comprising:

(a) means for generating a plurality of color component signals from said original color image;
(b) a plurality of color correction devices;
(c) means for simultaneously supplying a color component signal indicative of a single color component of said original color image to said correction devices, each of said color correction devices modifying that said color component signal applied thereto in accordance with a respective color signal correction rule to derive a respective corrected color component signal; and
(d) means coupled to said correction devices and responsive to said plurality of corrected color component signals for recording images representative of said corrected color component signals on a record medium;
wherein said means for simultaneously supplying said color component signal comprises:
means for selecting one color component signal from said color component signals, and
switching means for separating said one color component signal into a plurality of color component signals and for coupling said plurality of color component signals in parallel to respective ones of the correction devices.

19. Apparatus as claimed in claim 18, wherein said plurality of color component signals are all identical.

20. Apparatus for obtaining a monochromatic image from an original color image, said apparatus comprising:

(a) means for generating a plurality of color component signals from said original color image;
(b) a plurality of color correction devices;
(c) means for simultaneously supplying a color component signal indicative of a single color component of said original color image to said correction devices, each of said color correction devices modifying that said color component signal applied thereto in accordance with a respective color signal correction rule to derive a respective corrected color component signal; and
(d) means coupled to said correction devices and responsive to said plurality of corrected color component signals for recording images representative of said corrected color component signals on a record medium;
wherein said means for simultaneously supplying said color component signal comprises:
means for combining said color component signals to obtain a combined color signal; and
switching means for separating said combined color signal into a plurality of color component signals and for coupling said plurality of color component signals in parallel to respective ones of the correction devices.

21. Apparatus as claimed in claim 20, wherein said combining means comprises averaging means for producing a weighted average of said color component signals whereby said combined color signal represents said weighted average.

* * * * *